No. 876,645. PATENTED JAN. 14, 1908.
I. HODGSON.
SPRING CUSHIONED TIRE.
APPLICATION FILED MAR. 16, 1906.
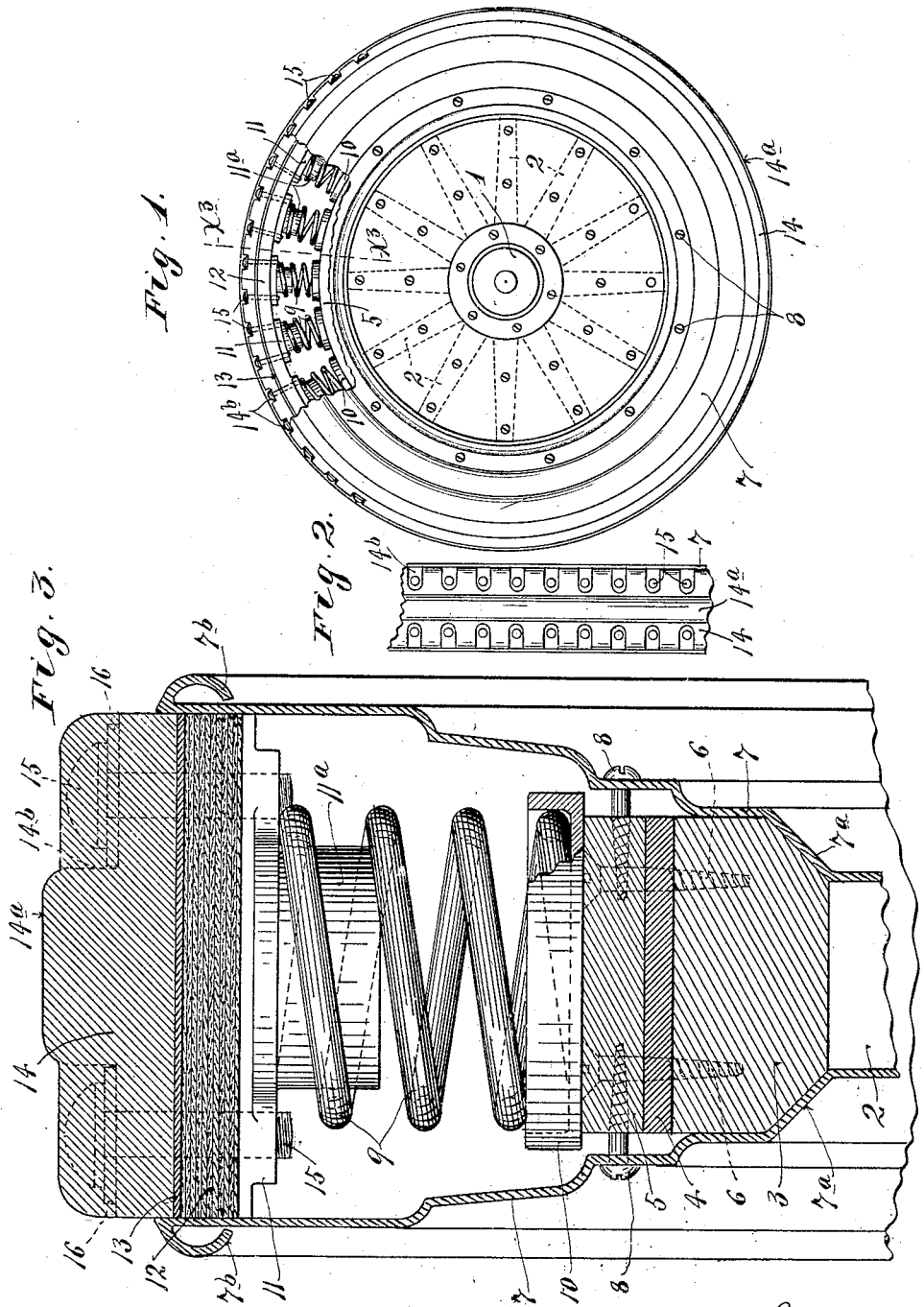
Witnesses.
A. H. Opsahl.
E. W. Jeppesen.
Inventor.
Isaac Hodgson
By his Attorneys
Williamson & Merchant

UNITED STATES PATENT OFFICE.

ISAAC HODGSON, OF MINNEAPOLIS, MINNESOTA, ASSIGNOR TO THE AUTOMOBILE WHEEL & RIM CO., OF MINNEAPOLIS, MINNESOTA, A CORPORATION OF NEW JERSEY.

SPRING-CUSHIONED TIRE.

No. 876,645.   Specification of Letters Patent.   Patented Jan. 14, 1908.

Application filed March 16, 1906. Serial No. 306,366.

*To all whom it may concern:*

Be it known that I, ISAAC HODGSON, citizen of the United States, residing at Minneapolis, in the county of Hennepin and State of Minnesota, have invented certain new and useful Improvements in Spring-Cushioned Tires; and I do hereby declare the following to be a full, clear, and exact description of the invention, such as will enable others skilled in the art to which it appertains to make and use the same.

My invention relates to wheels having resilient tires, and wherein springs are employed in lieu of pneumatic tubes, and has for its object to improve this class of tires in point of simplicity, durability, efficiency and in other particulars, all as hereinafter pointed out and defined in the claims.

The improved tire involves a plurality of springs that are preferably of spiral form and radially disposed, and are interposed between the rim of the wheel proper and a surrounding tension band, by means of which tension band the said springs are set under an initial compression. The wheel is provided with a pair of laterally spaced armor plates that project from the sides of the wheel rim and beyond the periphery thereof. The so-called tension band of the tire works between these armor plates and closely engages the same, so that dirt and dust cannot enter the annular compartment formed between the said armor plates and between the said tension band and the rim of the wheel. A multiplicity of radially coiled springs are contained within the annular compartment just indicated, and hence are protected from dirt, dust, and moisture.

A tread band, so-called, is secured to the tension band and surrounds the same. This tread band may be constructed in the form of an endless band, or it may be made up of sections, and it may be constructed entirely of rubber, or in part of rubber material and in part of metallic tread sections.

A vehicle wheel having a resilient tire embodying my invention is illustrated in the accompanying drawings, wherein like characters indicate like parts throughout the views.

Referring to the drawings, Figure 1 shows the wheel in side elevation with some parts broken away. Fig. 2 is a plan view showing a portion of the tread band of the wheel, and Fig. 3 is a transverse section taken on the line $x^3\ x^3$ of Fig. 1, the parts being shown on a larger scale in Fig. 3.

The numeral 1 indicates the hub, numeral 2 the spokes, and numeral 3 the rim of the wheel. In this preferred construction a metal band 4 surrounds the wheel rim 3, and a wood band 5, preferably of hickory, surrounds the metal rim 4, the said two rims 4 and 5 being rigidly secured together and to said rim by wood screws 6. The armor plates 7 are preferably continued inward to the hub of the wheel, as shown at $7^a$, so that the spokes of the wheel are entirely incased thereby. The said armor plates are bent to fit the wheel rim 3 and, as shown, are clamped to the hickory band 5 by means of wood screws 8. The projecting marginal portions of the armor plates 7 are preferably turned outward and backward, as shown at $7^b$, thereby forming rib-like reinforcements at the peripheral portions of said plates.

The coil springs 9 at their inner ends are seated in cup-like spring bases 10, that are seated directly against the wood band 5. The outer ends of the springs 9 are seated against spring caps 11 that are formed with cylindrical portions $11^a$ that telescope into the respective springs.

The spring caps 11 are surrounded by and bear against a tension band made up of a plurality of flexible folds 12 and a surrounding metal band 13. The pliable bands or folds 12 are preferably of heavy textile fabric such as canvas, and the endless metal band 13 is preferably of brass and of such thickness that it will readily yield and give the proper resiliency to the wheel. The edges of the fabric folds 12 have close engagement with the inner surfaces of the armor plates 7, but the reinforcing metal band 13 is preferably slightly narrower so that it will not engage with the said armor plates. This construction forms tight joints between the armor plates and the tension band and avoids squeaking by frictional engagement between the metallic parts 7 and 13. By adjustment of the screws 8 the armor plates 7 may be forced against the fabric 12 of the tension band under any desired pressure or frictional engagement.

The tread band 14 which, as shown, is constructed of rubber and is continuous, is formed with an unbroken central web portion $14^a$ and with depressed seats $14^b$ at intervals on each side of said rib $14^a$. This tread band is securely anchored to the tension band 12—13 as shown, by means of screws 15 that are passed through said plates 12—13 and 14, and are screwed into the respective spring caps 11. The heads of the screws 15 are located in the seats 14$^b$ of the tread band 14, and washers 16 are shown as interposed between said screw heads and the reduced portions of said tread band.

The manner of putting the parts of the resilient tire together and of applying them to the wheel rim is preferably as follows: First, the spring bases 10 are applied to the wooden outer band 5 of the wheel rim, next the springs are applied to said spring bases, and the spring caps 11—11$^a$ are applied to the outer ends of said springs. Then the said springs are put under an initial compression by some suitable machine or device not shown, and the tension band 12—13 is then applied around the circumferentially arranged series of spring caps, so that the said springs will be held under an initial compression of about one-fourth of an inch more or less. Then the tread band 14 may be applied to the tension band and secured by means of the screws 15. Of course nut bolts may be used in lieu of the screws 15 and, if desired, lock nuts may be applied to the inner ends of said screws. After this has been done the armor plates 7 may be secured in position by means of the screws 8. If desired, nutted bolts may be employed in lieu of these screws 8.

The length of the cylindrical hubs or sleeves 11$^a$ of the spring caps is preferably such that under maximum compression they will strike the bottoms or web portions of the respective spring bases 10. It will thus be seen that the cylindrical hubs of the spring caps, the springs, and the cylindrical flanges of the spring bases telescope with respect to each other under vibratory movements of the springs, and thus materially increase the lateral rigidity of the tire, that is, the ability of the tire to withstand lateral strains on the wheels incident to traveling on curves and under sluing actions of the wheels. The armor plates 7, of course, also very greatly increase the lateral stability of the tire. Thus with the tire above illustrated it is impossible for the springs to be toppled over under lateral strains on the wheel.

What I claim is:

1. The combination with a wheel rim, of armor plates applied thereto and extending circumferentially outward thereof, a yielding tension band made up of a multiplicity of pliable folds working between and having frictional engagement with the inner surfaces of both of said armor plates, radially disposed circumferentially spaced coiled springs interposed between said rim and said tension band, and tread devices applied to the exterior of said yielding tension band, substantially as described.

2. In a resilient tire, a plurality of radially disposed circumferentially spaced coiled springs, and a pliable tension band made up of inner pliable folds and an outer yielding metallic reinforcing band, substantially as described.

3. The combination with a wheel rim, of armor plates applied thereto and extending circumferentially outward thereof, a yielding tension band made up of pliable inner folds and an outward thin metal reinforcing band, said tension band working frictionally between said armor plates, radially disposed circumferentially spaced coiled springs interposed between said rim and said tension band, and tread devices applied to the exterior of said tension band, substantially as described.

In testimony whereof I affix my signature in presence of two witnesses.

ISAAC HODGSON.

Witnesses:
 I. HODGSON, Jr.,
 G. J. PRESCOTT.